Nov. 1, 1938.　　　　　W. L. SMITH　　　　　2,134,932
GYROCOMPASS
Original Filed Oct. 26, 1933　　4 Sheets-Sheet 2

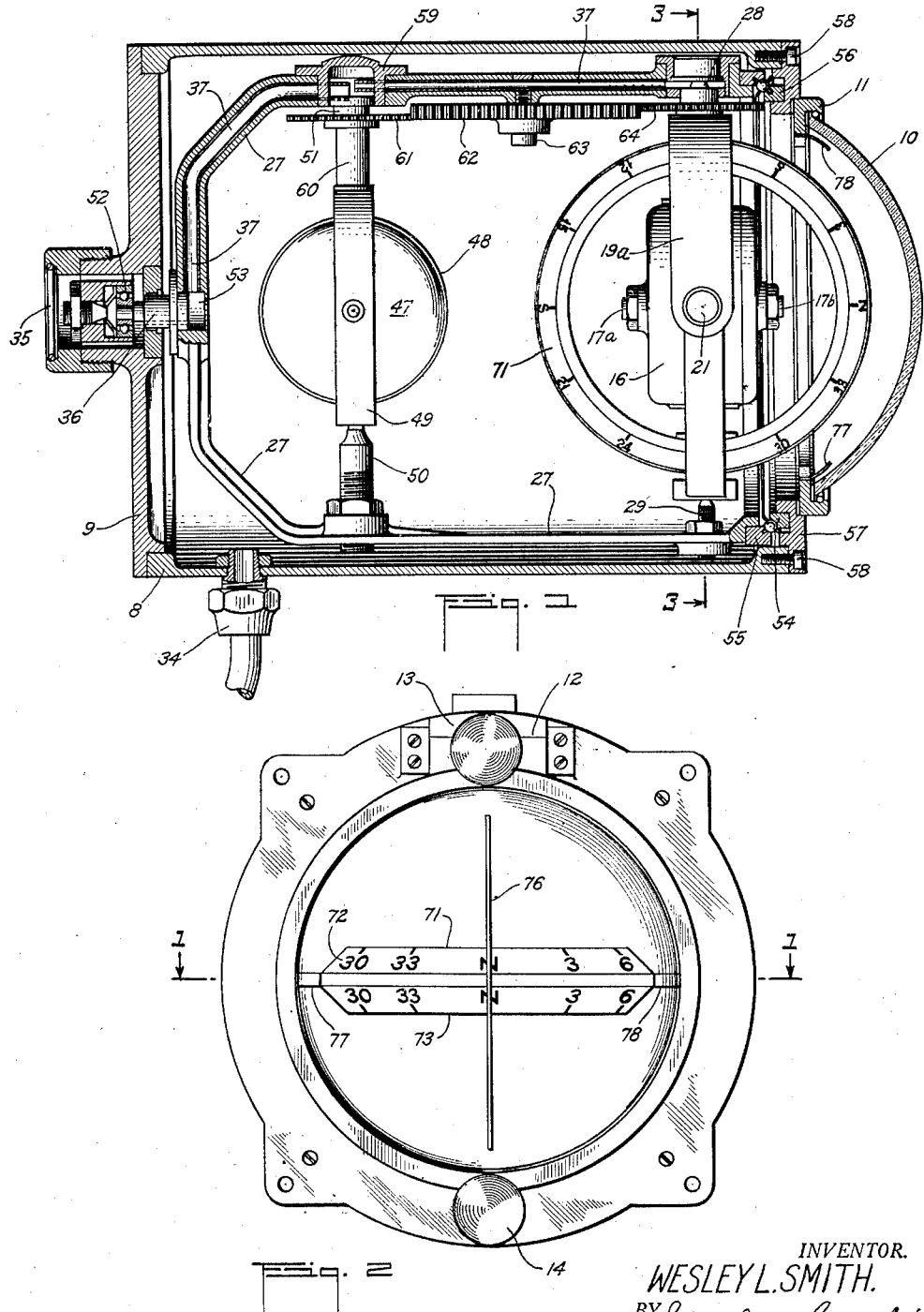

INVENTOR.
WESLEY L. SMITH.
BY Stephen Cerstvik
ATTORNEY.

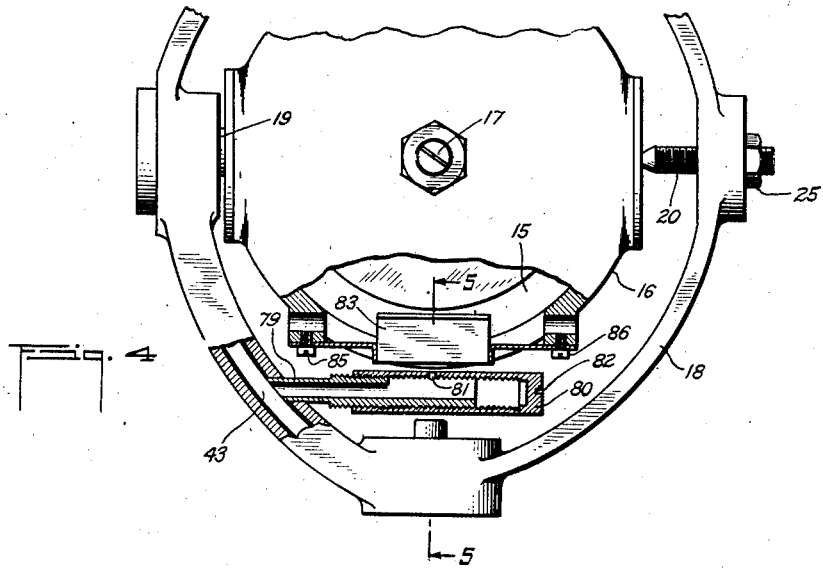
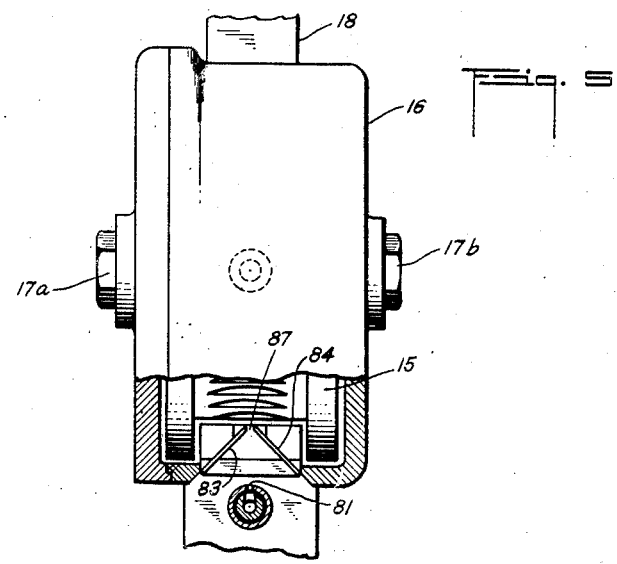

Nov. 1, 1938.                    W. L. SMITH                    2,134,932
                                  GYROCOMPASS
                      Original Filed Oct. 26, 1933    4 Sheets-Sheet 4
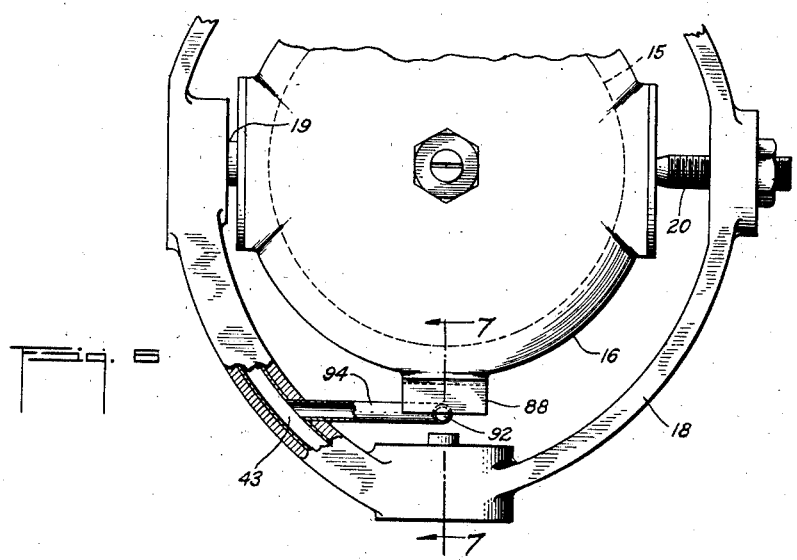
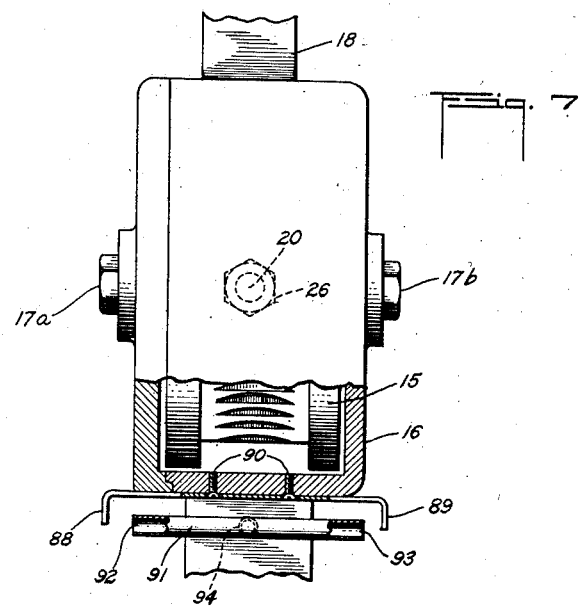
INVENTOR.
WESLEY L. SMITH.
BY Stephen Cerstvik
                ATTORNEY.

Patented Nov. 1, 1938

2,134,932

UNITED STATES PATENT OFFICE 2,134,932

GYROCOMPASS

Wesley L. Smith, Cranford, N. J., assignor to Eclipse Aviation Corporation, East Orange, N. J., a corporation of New Jersey Application October 26, 1933, Serial No. 695,359
Renewed February 17, 1938

17 Claims. (Cl. 33—226)

The present invention relates to gyro-compasses and, more particularly, to a gyro-compass which, in addition to its function as a compass, serves to indicate the longitudinal and lateral attitude of the craft, i. e., the bank and pitch thereof.

Heretofore, gyro-compasses have been built in which a horizontally spinning rotor was universally mounted in horizontal gimbals and in a vertical gimbal and to which north-seeking properties were imparted by means of a weight connected to the rotor frame thereby making it pendulous and, hence, causing the rotor axis to precess into alignment with the earth's axis due to the action of gravity on the weight and due to the rotation of the earth. Such compasses were relatively large because of the necessarily large rotor and weight which had to be employed and, although suitable for installation on large marine vessels, they could not be advantageously used in aircraft for two main reasons, viz: first, because of the excessive weight and, second, because of the pendulousness of the system which caused continual undesirable precession of the compass due to the high acceleration forces which are generally present on an aircraft, particularly during violent manœuvers.

Accordingly, one of the objects of the present invention is to provide a novel gyro-compass in which the fore-going difficulties are eliminated, thereby rendering it suitable for aircraft use.

Another object of the invention is to provide a novel aircraft indicating instrument of the gyroscopic type embodying a single indicating element for indicating the movement of the aircraft about all three axes thereof and in which the movement about the vertical axis is indicated in terms of true azimuth whereby a pilot may fly "blind" without using any other instruments.

Another object is to provide novel means in a gyro-compass having a horizontally spining rotor mounted in a non-pendulous frame for three degrees of freedom, whereby the axis of the gyro rotor of the compass is maintained parallel to the earth's surface and is caused to align itself into the plane of the earth's axis so that the compass will point true north and so that the compass card thereof will serve to indicate longitudinal and lateral inclination of the aircraft.

Another object is to provide a novel gyro-compass structure in which the axis of the rotor is maintained parallel to the earth's surface and in the plane of the earth's axis without the use of a pendulous weight or mass on the compass frame itself, thereby preventing any precession thereof by acceleration forces that may be present on an aircraft carrying the compass.

Still another object is to provide a novel non-pendulous gyro-compass embodying a horizontally spinning gyro rotor having three degrees of freedom, and means unaffected by high accelerations but controlled by gravity for maintaining the axis of the rotor in a plane parallel to the earth's surface whereby the rotor axis is caused to precess into the plane of the earth's axis, thus indicating true North.

Still another object is to provide a novel non-pendulous gyro-compass embodying a horizontally spinning gyroscope and a horizontal support therefor which is unaffected by acceleration forces and means whereby the compass card of the compass serves to indicate the pitch and bank of an aircraft as well as the earth's true meridian.

The above and other objects and advantages of the invention will appear more fully hereinafter from a consideration of the detailed description which follows, taken together with the accompanying drawings wherein three embodiments of the invention are illustrated. It is to be expressly understood, however, that the drawings are for the purpose of illustration and description only and are not designed as a definition of the limits of the invention, reference being had for this purpose to the appended claims.

In the drawings wherein like reference characters refer to like parts throughout the several views:

Fig. 1 is a sectional plan view of one form of non-pendulous gyro-compass embodying the present invention taken on line 1—1 of Fig. 2 and rotated 90 degrees;

Fig. 2 is a front elevation of the compass shown in Fig. 1;

Fig. 4 is a partial view, partly in section, of the compass gyroscope and showing another embodiment of the novel control for maintaining the axis of the gyro rotor in the plane of the earth's meridian;

Fig. 5 is another partial view, partly in section, taken along line 5—5 of Fig. 4;

Fig. 6 is a partial view, partly in section, of still another embodiment of the novel control for the compass; and Fig. 7 is a partial sectional view taken on line 7—7 of Fig. 6.

Figure 3:
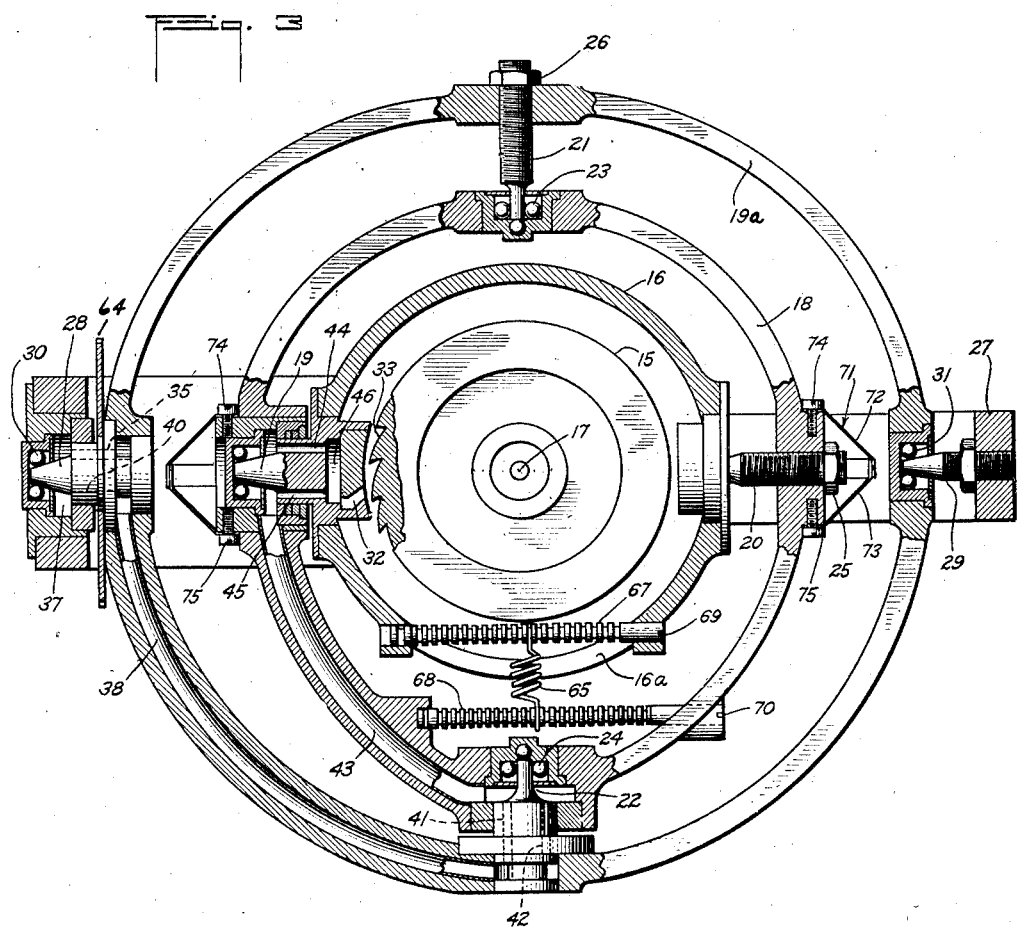
Fig. 3 is a vertical section of the non-pendulous gyroscope taken on line 3—3 of Fig. 1 and showing one embodiment of the novel connection between the compass gyro and the horizontal support whereby north-seeking properties are imparted to the gyroscope.

Referring now to the drawings and more particularly to Figs. 1, 2 and 3, the novel non-pendulous gyro-compass embodying the present invention comprises, as shown, a suitable casing 8 having one end thereof closed as indicated at 9 and provided at its other end with a transparent cover-glass 10 secured thereto in any suitable manner as by means of a ring 11 which is removably secured to the casing by means of a clamping plate 12 (Fig. 2) and thumb screws 13 and 14 so that the cover-glass 10 may be removed in order to permit adjustment or setting of the gyroscope when desirable or necessary.

The compass gyroscope is mounted within the casing 8 so as to be visible through the cover-glass 10 and, in the form shown in Fig. 3, comprises a rotor 15 mounted in a casing 16 for rotation about a horizontal axis 17 as by means of adjustable bearings 17a and 17b (Fig. 1). The casing 16 is pivoted in a vertical gimbal ring 18 by means of pivots 19 and 20 about a horizontal axis perpendicular to the axis of rotation 17. The vertical gimbal ring 18 is journaled in another vertical gimbal ring 19a by means of pivots 21 and 22 and ball bearings 23 and 24, respectively, so that said ring 18, casing 16 and rotor 15 may rotate in azimuth about a vertical axis co-incident with the pivots 21 and 22. Horizontal pivot 20 and vertical pivot 21 are made adjustable by means of nuts 25 and 26, respectively, in order to obtain proper balance of the gyroscope and to prevent pendulousness thereof. The vertical gimbal ring 19a is, in turn, journaled in a horizontal support 27 in any suitable manner as by means of pivots 28 and 29 and ball bearings 30 and 31, respectively, so that said ring 19a may move about an axis parallel to or co-incident with the transverse axis of the craft on which the compass is to be carried. It will thus be seen that the rotor 15 is mounted for rotation about axis 17 and for three degrees of freedom, namely, for movement about axes 21, 22 and axes 19, 20 and 28, 29, these latter axes being shown in the present instance to be in alignment with each other although in other positions of the rotor axis 17 and, hence, of gimbal ring 18 for different headings other than true north, said axes will be at an angle with respect to each other in a horizontal plane as, for example, perpendicular to each other when the craft is on an east-west course.

Any suitable means may be provided for rotating the gyro rotor on its axis 17 in order to impart gyroscopic properties thereto but in the form shown said means are constituted by an air drive comprising an air nozzle 32 for directing a jet of air against a series of turbine buckets provided on the periphery of the rotor 15. Air for driving the gyroscope may be derived either by a pressure pump or a suction pump (not shown). If the latter be used, then it is connected to the casing in any suitable manner as by means of a coupling member 34 see Fig. 1 for exhausting the air from the casing. Upon exhausting the air from the casing in this manner, air is sucked into the casing through a screened opening 35 provided preferably at the rear wall 9 of the casing 8 and passes through an opening 36 which is connected to a passage 37 (Fig. 1) provided in the horizontal support 27, the latter being made hollow for this purpose. The passage 37 continues through the horizontal support to the pivot 28 where it is connected to a passage 38 in gimbal ring 19a (Fig. 3) by means of suitable openings 39 and 40 provided in said pivot 28. The passage 38 leads to the pivot 22 which is also provided with a pair of openings 41 and 42 leading to a similar passage 43 provided in the vertical gimbal ring 18. From the passage 43 the air passes through a pair of openings 44 and 45 provided in the pivot 19 and which communicates with a small chamber 46, and out through the nozzle 32 which is connected with the chamber 46 thereby driving the rotor 15. The air then is discharged from casing 16 into casing 8 through an opening 16a. If a pressure pump be used, then the latter may be connected to the opening 35 and the air pumped into the casing and exhausted through the coupling 34 after passing through the horizontal support 27, vertical gimbal ring 19a, vertical gimbal ring 18 and nozzle 32. On aircraft, if desired, a Venturi tube may be used instead of a suction pump, said tube being mounted in the wing of the aircraft to produce a suction as the craft moves through the air.

The gyroscope assembly including the rotor 15, casing 16, rings 18 and 19a, is so constructed, proportioned and arranged that it is entirely non-pendulous about the pivots 19, 20 and 28, 29 thereby rendering the whole assembly unsusceptible to acceleration forces and/or gravity, thus preventing any undesirable precession of the rotor axis 17 due to such forces.

The gyroscope assembly described thus far would constitute a directional gyroscope, i. e., a position-keeping gyro, axis 17 of which would tend to remain fixed in space. In accordance with the present invention, however, the rotor 15 is made to operate as a gyro-compass and for this purpose novel means are provided for causing the rotor axis 17 to remain parallel to the earth's surface at all times without providing any weights on the gyroscope frame and to cause said axis 17 to precess and align itself in the plane of the earth's axis thereby indicating the earth's true meridian. In the form shown (Fig. 1), said means comprise a gyro-pendulum of any well-known type and shown conventionally at 47 and having a vertically spinning gyroscope, (not shown) mounted in a casing 48, which is pivoted for angular movement about two mutually perpendicular horizontal axes by means of a gimbal ring 49 which is pivoted in the horizontal support 27 by means of pivots 50 and 51, the pivot 50 being adjustable, and by pivoting the horizontal support 27 in the casing 8 in the same plane with pivots 50 and 51 on an axis at right angles thereto by means of ball bearings 52 and pivot 53 in the wall 9 of the casing 8 and by means of a plurality of ball bearings 54 arranged circumferentially between a ring 55 secured to the front end of the support 27 and a cooperating ring 56 carried by an annular plate 57 secured to the casing in any suitable manner as by means of screws 58.

The gyro-pendulum 47 is preferably of the type disclosed in co-pending application, Serial No. 701,201 filed December 6, 1933, wherein means are provided whereby said gyro-pendulum is unaffected by acceleration forces and the spinning axis of the rotor is maintained vertical at all times. The rotor of the gyro-pendulum may also be air-driven and for this purpose a junction box 59 is provided on the frame 27, in which the air passing through passage 37 is permitted to enter the gimbal ring 49 through a passage 60 provided in the pivot 51 and then finally entering the casing 48 in a manner similar to that shown for the operation of the rotor 15 of the gyro-compass rotor.

It will thus be seen that by virtue of the pivotal mounting of the gyro-pendulum 47 in the frame 27 about the axis of the pivots 50, 51 and the pivotal mounting of the frame 27 about the axis of pivot 53, the pendulum will always maintain a true vertical position within the casing 8, i. e., the vertical spin axis of the gyro-pendulum will always be co-incident with a radial line extending toward the center of the earth and will remain unaffected by acceleration forces produced by an increase or decrease in the speed of the aircraft on which the instrument is mounted, thus providing at all times a horizontal reference plane which is always parallel to the surface of the earth against which the motion of the aircraft about the longitudinal or lateral axes of the craft or both may be co-related to obtain a desired indication of such motions. It will also be seen that by virtue of the fact that the compass rotor 15 is mounted in the same frame with the gyro-pendulum, namely frame 27, any motion of the frame about the pivot 53 caused by the gyro-pendulum will move the axis 17 of the rotor 15 therewith. In order that the axis 17 of the rotor 15 may also incline about the axes of the pivots 28, 29 simultaneously with the inclination of the gyro-pendulum 47 about the axis of the pivots 50, 51, a connection is provided therebetween which, in the form shown, is constituted by a gear 61 secured to or formed integrally with the pivot 51 and which meshes with a gear 62 journaled on a stub shaft 63 carried by the frame 27. The gear 62, in turn, meshes with a gear 64 secured to or formed integrally with the pivot 28. Thus, the mounting of the gyro-pendulum 47 and that of the compass gyro 15 are interlocked through the gears 61, 62, 64 so that upon inclination of the craft on which the instrument is mounted, about its transverse axis, the casing 8 will also incline but the compass gyro and the gyro-pendulum will remain fixed in space with the axis 17 of the rotor 15 in a plane parallel to the earth's surface. If, however, the gyro-pendulum 47 is acted upon by gravity due to a change of position of the craft in space, without any inclination of the craft about either its transverse or longitudinal axis, then the inclination of the gyro-pendulum, due to such action, will be imparted to the vertical gimbal ring 19a through the gears 61, 62, 64, thus causing the vertical gimbal 19a to move about the pivots 28 and 29. This motion of the vertical gimbal ring 19a is employed to cause the axis 17 of the rotor 15 to precess in azimuth into the plane of the earth's axis inasmuch as the axis 17 is displaced from the plane of the earth's axis upon a change of position of the aircraft in space, i. e., when the aircraft has traversed a distance over and about the earth's surface. For this purpose a resilient connection is provided between the casing 16 of the rotor 15 and the vertical gimbal ring 18 which moves simultaneously with the movement of ring 19a about the latter's pivots 28, 29 and, in the form shown in Fig. 1, the connection comprises a spring 65 one end of which is connected to a threaded rod 67 carried at the lower portion of the rotor casing 16 and the other end of which is secured to a similarly threaded rod 68 carried by the vertical ring 18, both of said rods being provided at one of their ends with slots 69 and 70, respectively, for rotating them in order to obtain the proper bias of the spring 65 on the rotor casing 16. The biasing of the spring 65 is desirable in order to correct for changes in latitude so that proper precession of rotor 15 may be obtained for different latitudes. It will be apparent that the gyroscopic effect of the rotor 15 tends to cause the axis 17 to remain fixed in space but upon movement of the vertical gimbal 19a and, hence, the ring 18 about the pivots 28, 29 by the action of the gyro-pendulum 47 through the gears 61, 62, 64, a torque will be exerted on the rotor casing 16 and, hence, on the gyro about the pivots 19, 20 thereby causing the vertical gimbal 18 to rotate in the vertical pivots 21, 22, thus causing a rotation of the axis 17 in azimuth until said axis is in the plane of the earth's axis as determined by the position of the vertical axis of the gyro-pendulum with respect to the center of the earth. In this manner a gyro-compass action is imparted to the rotor 15 so that the axis 17 will always precess into the plane of the earth's axis to indicate the earth's true meridian.

In order to obtain indications of the position of the axis 17 of the rotor 15 in azimuth in terms of compass direction, there is provided a compass card 71 secured to and rotatable with the vertical gimbal ring 18 and which, in the form shown (Fig. 3), comprises an annular member composed of two portions 72 and 73 on which the compass graduations are marked in any suitable manner, as by etching, and the one of which is secured to the gimbal ring 18 by screws 74 and the other of which is secured to said ring by screws 75. The two portions 72 and 73 are so arranged together that the cross-section thereof is substantially triangular whereby the compass graduations may be read either from the front of the compass card or from above or below it upon inclination of the craft. Cooperating with the compass card, is a lubber's line 76 located centrally and vertically at the front end of the casing 8 and may be provided on the cover-glass 10 as shown in Fig. 2 or arranged in any other suitable manner which will be most convenient in the construction of the instrument. Also cooperating with the periphery of the compass card along a horizontal line perpendicular to the lubber's line 76, are a pair of index members 77 and 78 which, in the present instance, are carried by the ring 11 (Fig. 1), thus providing a reference against which the lateral and vertical position of the compass card is co-related upon a lateral or longitudinal inclination of the craft and, hence, of the casing 8, inasmuch as the compass card is mounted in horizontal gimbals constituted by the pivots 28, 29 and pivot 53 with the annularly arranged ball bearings 54.

The operation of the instrument is as follows:

Air is introduced into the casing 8 through the opening 35 and passes through the frame 27 to the gyro rotors of the gyro-pendulum 47 and the compass casing 16, respectively, and is exhausted through the coupling 34 thereby driving said rotors. The gyroscopic action of the respective rotors causes the spin axis of the gyro-pendulum 47 to remain vertical in space and the axis 17 of the rotor 15 to remain horizontal in space. If now the craft on which the instrument is mounted inclines about either its transverse or longitudinal axis thereby causing similar inclination of the casing 8, the latter will move with respect to the gyros which remain stationary as a unit due to the interlocked connection thereof through the gears 61, 62, 64. Thus, an upward inclination of the casing 8 with the craft about the transverse axis will cause a relative movement between the compass card 71 and the reference indices 77 and 78 so that the latter move downwardly while the compass card appears to be moving upwardly. Also upon a movement of the craft about its longitudinal axis, i. e., when it is banking or rolling, the compass card 71 will appear to be inclined to the right or left depending upon whether the craft has banked to the left or to the right, thus giving a continuous indication of the attitude of the craft with respect to the horizon. If, however, the air craft is in level flight and the gyro-pendulum 47 is acted upon by gravity due to a change of position of the craft in space, the pendulum will transmit its action to the vertical gimbal ring 18a and vertical gimbal ring 18 through the gears 61, 62, 64, causing movement of said rings about the pivots 28, 29 thereby imparting a torque on the gyro rotor 15 about the pivots 19, 20 whereupon the axis 17 of the rotor precesses in azimuth about the pivots 21, 22 until it is in the plane of the earth's axis thereby indicating the earth's true meridian. Also, if the craft deviates to the left or to the right, the axis 17 of the rotor 15 will remain fixed in space and show such deviation on the compass card 71 in terms of compass degrees. Thus, by the action of the gyro-pendulum 47, the axis 17 of the rotor 15 is always maintained parallel to the surface of the earth and in the plane of the earth's axis so that the compass card 71, which is secured to the vertical ring 18, indicates, at all times, the true compass direction and the deviation of the craft about its three axes whereby the necessity for a separate compass and a separate horizon indicator is eliminated and only one instrument need be observed.

Referring to Figs. 4 and 5, there is shown another embodiment of the invention wherein the resilient connection between rotor casing 16 and vertical gimbal ring 18 is in the form of a pneumatic connection taking the place of the spring 65 shown in Fig. 3. This embodiment of the invention has been found more desirable than that shown in Figs. 1 to 3 because by using a pneumatic connection, the "kick-back" or reaction is eliminated which sometimes ocurs when a spring is used. In the form shown, said pneumatic connection comprises a hollow tubular member 79 carried by the vertical gimbal ring 18 and having communication with the air passage 43 in said ring. The member 79 projects horizontally from the ring and is arranged to threadedly receive an outer tubular member 80 which is provided with an orifice 81. The tubular member 80 is provided with a slot 82 at its free end in order that it may be threadedly adjusted so that the orifice 81 will project upwardly and will be located substantially centrally of the rotor casing 16, that is, substantially in alignment with the vertical axis of the vertical gimbal ring 18. The orifice may also be adjusted in this manner to secure the proper effect or torque on the rotor 15. Cooperating with the orifice 81 are a pair of vanes 83 and 84 which are secured to the casing 16 in any suitable manner as by means of screws 85 and 86 and arranged to extend upwardly toward the center of the periphery of the rotor 15 so that normally when the rotor 15 is not inclined about either of its horizontal axes, the air jet issuing from the orifice just clears the vanes 83 and 84 and passes through the gap 87 therebetween. If, however, the gimbal ring 18 is moved with ring 19a about the pivots 28, 29 and hence about 19, 20, with respect to 16 by the action of the gyro-pendulum in either direction, the air jet from the orifice 81 will strike either the vane 83 or the vane 84 thereby causing a torque to be applied on the rotor 15 about the pivots 19 and 20, thus causing the axis 17 of said rotor to precess in azimuth about the vertical pivots 21, 22 in the same manner as when the torque is imparted thereto by the spring 65 in Fig. 1 thereby causing said axis 17 to precess into the plane of the earth's axis.

In Figs. 6 and 7 is illustrated a further embodiment of the novel connection between the rotor casing 16 and vertical gimbal 18 to produce a torque on the gyro whereby the rotor axis is caused to precess in azimuth and, as illustrated, comprises a pair of vanes 88 and 89 arranged in vertical planes on either side of the rotor casing 16 and at the bottom thereof and formed, in the present instance, from a single piece which is secured to the rotor casing in any suitable manner as by means of screws 90. Cooperating with these vanes 88 and 89 is a hollow tubular member 91 open at both ends as indicated at 92 and 93 and at right angles to a connecting tubular member 94 carried by the vertical gimbal ring 18 and having communication with the passage 43 in said ring 18. The air from the passage 43 will enter the tubular member 94 and issue from the ends 92, 93 of the member 91 and strike against the ends of the vanes 88 and 89, the latter being so arranged that as the jets issue from the ends 92, 93, one-half of said jets impinges on said vanes and the other half goes by them. The force produced by the jets on the vanes 88 and 89 is exactly equal but opposite. If, however, the gimbal ring 18 is moved about the pivots 19, 20 by the action of the gyro-pendulum 47 thus causing relative movement between the member 91 and vanes 88, 89, one of the openings 92, 93 will be moved from its associated vane whereas the other opening moves further toward its associated vane thereby producing a torque in the direction in which the air jet impinges on the associated vane. For example, if the ring 18 is moved so that the lower portion thereof moves to the right, as viewed in Fig. 7, the air jet issuing from the opening 92 will clear the vane 88 but the air jet issuing from the opening 93 will strike the vane 89 thereby causing a torque on the rotor 15 in a counterclockwise direction about the pivots 19, 20. If the ring 18 moves in an opposite direction, the torque on the rotor 15 will be clockwise about the pivots 19, 20 thus causing the axis 17 of the rotor 15 to precess in one direction or another about the vertical pivots 21, 22 until said axis is in the plane of the earth's axis.

There is thus provided a novel gyro-compass having a horizontally spinning rotor which is mounted in a non-pendulous system in which no weight or mass is employed thereby preventing undesirable precession of the rotor axis due to the action of acceleration forces which would otherwise affect the compass if a weight or mass were employed. There is also provided a novel gyroscopic structure in which the ordinary weight or mass is replaced by novel means whereby the axis of the compass rotor is always maintained parallel to the surface of the earth and in the plane of the earth's axis and which is so mounted that the compass card carried by the rotor serves, in addition to its function as a compass, to indicate the longitudinal and lateral attitude of the craft, also deviation of the latter from the compass course thereby providing a single instrument which will enable a pilot to fly "blind" and give him all necessary indications to maintain his craft in level flight on a pre-determined course.

While three embodiments of the invention have been illustrated and described, it will be apparent to those skilled in the art that various changes and modifications in the organization and relative arrangement of the parts may be made without departing from the scope of the invention. Reference is, therefore, to be had to the appended claims for a definition of the limits of said invention.

What is claimed is:

1. In combination, a casing adapted to be mounted on an instrument board, a frame pivotally mounted in said casing for angular movement about a horizontal axis, a gyro-pendulum pivotally mounted in said frame and within the boundary thereof for angular movement about a second horizontal axis at an angle to the first horizontal axis, an azimuth gyro also pivotally mounted in said frame and within the boundary thereof for angular movement about a horizontal axis parallel to the second axis, a compass card controlled by said azimuth gyro, and means connecting said gyro-pendulum and said azimuth gyro within said frame whereby the gyro-pendulum applies a torque to and thus causes the azimuth gyro to precess about a vertical axis until its axis of rotation is in the plane of the earth's axis and parallel to the earth's surface, said precession being indicated on said compass card and whereby said compass card retains the positions of said gyro pendulum about either of two mutually perpendicular horizontal axes of said card to indicate an inclination relative to said casing.

2. In combination, a casing adapted to be mounted on an instrument board, a frame pivotally mounted in said casing for angular movement about a horizontal axis, a gyro-pendulum pivotally mounted in said frame and within the boundary thereof for angular movement about a second horizontal axis at an angle to the first horizontal axis, an azimuth gyro also pivotally mounted in said frame and within the boundary thereof for angular movement about a horizontal axis within the bondary of said frame and parallel to the second axis, a compass card controlled by said azimuth gyro, and yielding means connecting said gyro-pendulum and said azimuth gyro whereby the gyro pendulum applies a torque to and thus causes the azimuth gyro to precess about a vertical axis until its axis of rotation is in the plane of the earth's axis and parallel to the earth's surface, said precession being indicated on said compass card and whereby said compass card retains the positions of said gyro pendulum about either of two mutually perpendicular horizontal axes of said card to indicate an inclination relative to said casing.

3. A gyro-compass comprising, in combination, a casing having means for mounting it on a substantially vertical instrument panel with the longitudinal axis of the casing substantially perpendicular to the panel, a frame pivotally mounted in said casing for angular movement about a horizontal axis parallel to or co-incident with the longitudinal axis of the casing, a gyro-pendulum pivotally mounted in said frame for angular movement about a second horizontal axis at an angle to the first horizontal axis, an azimuth gyro also pivotally mounted in said frame for angular movement about a horizontal axis parallel to the second horizontal axis, an annular compass card controlled by said azimuth gyro in a horizontal plane and having graduations on the periphery thereof visible through the front end of the casing when the latter is mounted on the panel, and means connecting said gyro-pendulum and said azimuth gyro for synchronous movement about said parallel horizontal axes in the same direction.

4. In a gyro-compass, the combination of a support, a frame mounted on said support for angular movement about a horizontal axis, a vertical gimbal ring mounted in said frame for angular movement about another horizontal axis perpendicular to said first horizontal axis, a second vertical gimbal ring mounted within said first vertical ring for angular movement about an axis normally perpendicular to said two horizontal axes, an azimuth gyroscope mounted in said second vertical gimbal ring for rotation about a horizontal axis and for angular movement about another horizontal axis at right angles to its axis of rotation, a gyro-pendulum mounted in the frame for angular movement about a horizontal axis parallel to the horizontal axis of said first gimbal ring, means connecting said gyro-pendulum and said first vertical gimbal ring for like synchronous movement about their parallel axes, and means effective upon relative tilting movement of the rotor axis of said azimuth gyroscope relatively to said second vertical gimbal ring for applying a torque thereto about its horizontal axis which is at right angles to its rotor axis to bring the latter to the meridian.

5. In a gyro-compass, the combination of a support, a frame mounted on said support for angular movement about a horizontal axis, a vertical gimbal ring mounted in said frame for angular movement about another horizontal axis perpendicular to said first horizontal axis, a second vertical gimbal ring mounted within said first vertical ring for angular movement about an axis normally perpendicular to said two horizontal axes, an azimuth gyroscope mounted in said second vertical gimbal ring for rotation about a horizontal axis and for angular movement about another horizontal axis at right angles to its axis of rotation, a gyro-pendulum mounted in the frame for angular movement about a horizontal axis parallel to the horizontal axis of said first gimbal ring, means connecting said gyro-pendulum and said first vertical gimbal ring for like synchronous movement about their parallel axes, and resilient means effective upon relative tilting movement of the rotor axis of said azimuth gyroscope relatively to said second vertical gimbal ring for applying a torque thereto about its horizontal axis which is at right angles to its rotor axis to bring the latter to the meridian.

6. In a gyro-compass, the combination of a support, a frame mounted on said support for angular movement about a horizontal axis, a vertical gimbal ring mounted in said frame for angular movement about another horizontal axis perpendicular to said first horizontal axis, a second vertical gimbal ring mounted within said first vertical ring for angular movement about an axis normally perpendicular to said two horizontal axes, an azimuth gyroscope mounted in said second vertical gimbal ring for rotation about a horizontal axis and for angular movement about another horizontal axis at right angles to its axis of rotation, a gyro-pendulum mounted in the frame for angular movement about a horizontal axis parallel to the horizontal axis of said first gimbal ring, means connecting said gyro-pendulum and said first vertical gimbal ring for like synchronous movement about their parallel axes, and air-operated means effective upon relative tilting movement of the rotor axis of said azimuth gyroscope relatively to said second vertical gimbal ring for applying a torque thereto about its horizontal axis which is at right angles to its rotor axis to bring the latter to the meridian.

7. In a gyro-compass, the combination of a support, a frame mounted on said support for angular movement about a horizontal axis, a vertical gimbal ring mounted in said frame for angular movement about another horizontal axis perpendicular to said first horizontal axis, a second vertical gimbal ring mounted within said first vertical ring for angular movement about an axis normally perpendicular to said two horizontal axes, an azimuth gyroscope mounted in said second vertical gimbal ring for rotation about a horizontal axis and for angular movement about another horizontal axis at right angles to its axis of rotation, a gyro-pendulum mounted in the frame for angular movement about a horizontal axis parallel to the horizontal axis of said first gimbal ring, means connecting said gyro-pendulum and said first vertical gimbal ring for like synchronous movement about their parallel axes, and a spring connected between said azimuth gyro and said second vertical ring and effective upon relative tilting movement of the rotor axis of said azimuth gyroscope relatively to said second vertical gimbal ring for applying a torque thereto about its horizontal axis which is at right angles to its rotor axis to bring the latter to the meridian.

8. In combination, a casing adapted for mounting on an instrument panel, a frame mounted in said casing for angular movement about a horizontal axis, a gyro-pendulum mounted in said frame and within the boundary thereof for angular movement about another horizontal axis at an angle to said first horizontal axis, an azimuth gyro also mounted in said frame and within the boundary thereof for universal angular movement about horizontal and vertical axes within the boundary of said frame, and means connecting said gyro-pendulum and said azimuth gyro whereby the former applies a direct torque to the azimuth gyro about the latter's horizontal axis when said gyro attempts to elevate or depress its spin axis as a result of a position of said axis outside the vertical plane of the meridian.

9. In combination, a casing adapted for mounting on an instrument board, a frame mounted in said casing for angular movement about a horizontal axis, a gyro-pendulum mounted in said frame and within the boundary thereof for angular movement about another horizontal axis at an angle to said first horizontal axis, an azimuth gyro also mounted in said frame and within the boundary thereof for universal angular movement about horizontal and vertical axes within the boundary of said frame, and yielding means connecting said gyro-pendulum and said azimuth gyro whereby the former applies a direct torque to the azimuth gyro about the latter's horizontal axis when said gyro attempts to elevate or depress its spin axis as a result of a position of said axis outside the vertical plane of the meridian.

10. In combination, in a casing adapted for mounting in an instrument panel, a gyro-pendulum, an azimuth gyro horizontally adjacent said gyro-pendulum, and means including a yielding connection between said gyro-pendulum and said azimuth gyro for applying a torque to the latter about a horizontal axis when the gyro tilts whereby said azimuth gyro is caused to precess into the meridian about a vertical axis by the action of the gyro-pendulum thereon due to the earth's rotation.

11. In combination, in a casing adapted for mounting in an instrument panel, a gyro-pendulum, an azimuth gyro mounted in the horizontal plane of said gyro-pendulum and adjacent thereto, a compass card controlled by said azimuth gyro in a horizontal plane, and means including a yielding connection between said gyro-pendulum and said azimuth gyro for applying a direct torque to said gyro about a horizontal axis when said gyro tilts for causing it to precess into the meridian about a vertical axis by the action of the gyro-pendulum thereon due to the earth's rotation, said precession being indicated on said compass card.

12. In combination, a non-pendulous azimuth gyroscope mounted for three degrees of freedom, a gyro-vertical horizontally adjacent said non-pendulous azimuth gyroscope, and means connecting said non-pendulous azimuth gyroscope and gyro-vertical, whereby said gyro-vertical applies a torque to and thus causes the azimuth gyroscope to precess about a vertical axis until its axis of rotation is in the plane of the earth's axis and parallel to the earth's surface.

13. In combination, an azimuth gyroscope mounted non-pendulously for three degrees of freedom and normally having direction-keeping properties, a gyro-vertical horizontally adjacent said non-pendulous azimuth gyroscope, and means connecting said azimuth gyroscope and said gyro-vertical, whereby said gyro-vertical imparts direction-seeking properties to said azimuth gyroscope by applying a torque thereto and thus causing it to precess about a vertical axis until its axis is in the plane of the earth's axis and parallel to the earth's surface.

14. In combination, an azimuth gyroscope mounted non-pendulously for three degrees of freedom and normally having direction-keeping properties, a gyro-vertical horizontally adjacent said non-pendulous azimuth gyroscope, and means connecting said azimuth gyroscope and said gyro-vertical, whereby said gyro-vertical imparts direction-seeking properties to said azimuth gyroscope by applying a torque thereto and thus causing it to precess about a vertical axis until its axis is in the plane of the earth's axis and parallel to the earth's surface, said connecting means comprising gear means.

15. In combination, a non-pendulous azimuth gyroscope mounted for three degrees of freedom and normally having direction-keeping properties, a gyro-vertical horizontally adjacent said non-pendulous azimuth gyroscope, and means connecting said non-pendulous azimuth gyroscope and said gyro-vertical, whereby said gyro-vertical imparts direction-seeking properties to said non-pendulous azimuth gyroscope by applying a torque thereto and thus causing it to precess about a vertical axis until its axis is in the plane of the earth's axis and parallel to the earth's surface, and an annular compass card carried by said gyroscope for indicting the precession of the latter.

16. A combined artificial horizon and gyro-compass for aircraft, comprising in combination, an instrument casing adapted to be mounted on an instrument board of an aircraft so that the front of said casing is visible to a pilot sitting in front of the instrument board, a non-pendulous azimuth gyroscope mounted in said casing for three degrees of freedom, said azimuth gyroscope being of the type which normally has direction-keeping properties instead of being direction-seeking, a gyro-vertical also mounted in said casing, an annular horizontal compass card carried by said azimuth gyroscope and having a portion visible from the front of said casing, and means connecting said azimuth gyroscope and gyro-vertical, whereby said gyro-vertical imparts direction-seeking properties to said azimuth gyroscope by applying a torque thereto and thus causing it to precess about a vertical axis until its axis is in the plane of the earth's meridian and parallel to the earth's surface, said precession being indicated on said compass card, and whereby said card retains the position of said gyro-vertical about both of two mutually perpendicular horizontal axes of said card to indicate inclination about said two axes relative to said casing.

17. A combined artificial horizon and gyro-compass for aircraft, comprising in combination, an instrument casing adapted to be mounted on an aircraft instrument board so that the front of said casing is visible to a pilot sitting in front of said instrument board, a non-pendulous azimuth gyroscope mounted in said casing for three degrees of freedom, said azimuth gyroscope normally having direction-keeping properties, a gyro-vertical also mounted in said casing and to the rear of said azimuth gyroscope as viewed from the front of the casing, an annular horizontal compass card carried and controlled by said azimuth gyroscope and having a portion visible from the front of said casing, and means connecting said azimuth gyroscope and gyro-vertical, whereby said gyro-vertical imparts direction-seeking properties to said azimuth gyroscope by applying a torque thereto and causing it to precess about a vertical axis until its axis is in the plane of the earth's meridian and parallel to the earth's surface, said precession being indicated on said compass card, and whereby said card retains the position of said gyro-vertical about both of two mutually perpendicular horizontal axes of said card to indicate inclination about said two axes relative to said casing.

WESLEY L. SMITH.